Jan. 21, 1958    F. B. SMITH    2,820,837
METHOD OF DISPERSING CARBON BLACK IN BULK RUBBER
Filed March 30, 1954

CONVENTIONAL PROCESS

MAKE CARBON BLACK RUBBER MASTERBATCH BY MIXING FOR 6-10' IN #27 BANBURY (50-60% UNDISPERSED CARBON BLACK)

↓

ADD COMPOUNDING INGREDIENTS TO MASTERBATCH AND MIX 4-5' IN #27 BANBURY (20% UNDISPERSED CARBON BLACK)

↓

TRANSFER TO ROLL MILLS FOR AT LEAST 10-15' ADDITIONAL MIXING (2-4% UNDISPERSED CARBON BLACK)

↓

TRANSFER TO TIRE TREAD TUBER

FIG. 1

PROCESS OF INVENTION

MIX CARBON BLACK WITH WATER AND ANIONIC WETTING AGENT FOR 5-10' IN WERNER-PFLEIDERER MIXER

↓

TRANSFER TO #27 BANBURY FOR 6' MIX WITH RUBBER AND COMPOUNDING INGREDIENTS (LESS THAN 2% UNDISPERSED CARBON BLACK)

↓

EXPRESS WATER

FIG. 2

FIG. 3

FIG. 4

INVENTOR.
FRANK B. SMITH
BY James J. Long
AGENT

United States Patent Office 2,820,837
Patented Jan. 21, 1958

2,820,837
METHOD OF DISPERSING CARBON BLACK IN BULK RUBBER

Frank B. Smith, Detroit, Mich., assignor to United States Rubber Company, New York, N. Y., a corporation of New Jersey Application March 30, 1954, Serial No. 419,745

3 Claims. (Cl. 260—763)

This invention relates to an improved method of dispersing carbon black in gum rubber in bulk form, and more particularly it relates to an improved method of achieving microscopic dispersion of carbon black in rubber.

One object of the invention is to obtain an improved state of carbon black dispersion, particularly in rubber tire tread mixes.

Still another object is to obtain a faster rate of dispersion of carbon black in bulk rubber.

It is yet another object of the invention to reduce the power requirements for mixing carbon black with bulk rubber.

Still a further object of the invention is to obtain more effective use of mixing equipment by reducing the length of the mixing cycles in Banbury mixers and related equipment.

It is still a further object of the invention to produce rubber tire tread mixes of improved quality.

The relation existing between resistance to wear and degree of dispersion of the reinforcing agent, namely, carbon black, in rubber articles such as tire treads is well recognized among manufacturers of rubber goods. Briefly, when the dispersion of the carbon black is excellent, say below 1% undispersed carbon black as observed under the microscope, then tread wear is very good. When the dispersion of the carbon black is poor, say above 10% undispersed carbon black, the resultant tread wear is apt to be impaired.

In conventional processes, a considerable amount of work is expended in an effort to disperse the carbon black. In tire practice, two or more mixing stages are usually specified, using initially an internal mixer, such as a Banbury mixer, followed by a train of three or four roll mills to which the stock is successively transferred to complete the mixing. Usually the carbon black only is incorporated in the rubber in the Banbury, to form a "masterbatch," to which the other compounding ingredients, such as vulcanizing agents and accelerator, are added at a later mixing stage on a roll mill or in a Banbury mixer, and it is in such later mixing stage that the final state of dispersion of the carbon black is obtained.

The conventional mixing procedure therefore represents a substantial item of expense in rubber processing, since much power is consumed, the equipment is extremely heavy and expensive to install and maintain, and the necessarily long mixing cycles very much limit the productivity of this expensive equipment. Furthermore, in spite of the strenuous mixing efforts, the degree of microscopic dispersion of carbon black obtained in practice is extremely variable and leaves much to be desired.

There are at least two approaches to the problem of improving the mixing and rendering it more economical. The first possibility is the re-engineering of present equipment or the design of new machinery. In this work, one generally adheres to established principles, seeking a way of more effectively applying energy to the mix. My invention is based on a second approach, which—in contradistinction to the first—is more of a physico-chemical nature.

The invention will be described with reference to the accompanying drawing, wherein:

Fig. 1 is a flow diagram representing a conventional tire tread stock mixing procedure;

Fig. 2 is a flow diagram representing a procedure of the invention;

Fig. 3 represents a microphotograph of a rubber-carbon black stock made by a conventional mixing process; and Fig. 4 is a similar view of a stock mixed in accordance with the invention.

Before stating the principle of my invention, it should first be explained that I have observed that when carbon black is mixed with rubber, the carbon black is first compacted or agglomerated into large aggregates or flakes, due to the compacting action of the mill. This effect is noted on the first pass through the mill nip. It has been observed that these masses are difficult to disperse and largely lacking in affinity for the rubber matrix. Prolonged milling is necessary to incorporate and disperse the cohesive flakes of carbon black into the elastomer. My invention is based upon the discovery that if a definite amount of water and a wetting agent is present when the carbon black is initially masticated with the rubber in an internal mixer, this compacting or agglomerating effect does not take place, and there takes place a greatly improved wetting of the carbon black by the rubber, with a consequent more rapid rate of dispersion, better dispersion, reduced power, and associated improvements.

In practicing the invention I typically employ the kind of carbon black known as pelletized carbon black, which is a dense, highly compressed kind of carbon black that is relatively non-dusting and easy to handle. The properties of carbon blacks of various degrees of compression are illustrated in the following table:

|  | Pounds per cubic ft. | Approximate specific gravity | Percent air |
| --- | --- | --- | --- |
| Original condition | 3.0 | 0.05 | 97.0 |
| Uncompressed | 13.4 | 0.21 | 88.0 |
| Semi-compressed | 21.1 | 0.34 | 81.0 |
| Heavy-compressed | 25.0 | 0.40 | 77.8 |
| Beads | 27.0 | 0.43 | 76.0 |

The so-called dustless or compressed carbon black (third and fourth grades, above), and especially the pelletized carbon black (beads) of high density, is employed in my invention.

In practicing the invention I typically first mix the dry carbon black (i. e., air-dry carbon black usually containing only a very small amount of moisture, such as some 1% moisture) with a certain type of wetting agent along with a definite amount of water within a certain critical range. For purposes of the invention there must be added to the dry carbon black, along with the wetting agent, at least 10 parts of water per 100 parts of the carbon black, and preferably some 10 to 50 parts of water is used. Although we sometimes use more water than this, say 160 parts, the invention is particularly directed to the use of smaller amounts of water in the range of 10 to 50 parts. In no case should the amount of water exceed 250 parts per 100 parts of carbon black. The wetting agent employed is any wetting agent selected from the group known as anionic wetting agents. The numerous known chemical classes of anionic wetting agents are described by Sisley and Wood in "Encyclopedia of Surface-Active Agents" (Chemical Publishing Co., New York, 1950), at pages 39 to 94, while a classified list of such agents is given at pages 135 to 156. Any of these materials are suitable for use in the invention. The amount of such anionic wetting agent employed in the invention is in no way critical, since it is only necessary to use a small amount effective to cause the water to wet the carbon black thoroughly. It may be mentioned by way of non-limiting example that from 4 to 6 parts of anionic wetting agent, per 100 parts of carbon black, is sufficient for ordinary purposes, and it is never necessary to use less than 2 parts or more than 10 parts. Among the more desirable kinds of anionic wetting agents for use in the invention, there may be mentioned the products obtained by sulfonation of natural and synthetic alcohols having six or more carbon atoms to obtain sodium salts of sulfuric esters or alkali sulfonates as enumerated on pages 144–149 of Sisley and Wood; the sulfonated hydrocarbons as enumerated on pages 150–155 of Sisley and Wood; and the products made from waste sulfite liquors as enumerated on page 156 of Sisley and Wood. However, the invention is not confined to the use of any particular anionic wetting agents, since such materials are in general operable in the invention, as indicated by extensive trials, whereas the cationic and anionic wetting agents are not operable. With the anionic wetting agent and the amounts of water specified, the mixture has a rather fluent consistency like that of a thin paste or slurry.

Mixing of the carbon black with the anionic wetting agent and the water is suitably effected in a mixer capable of exerting substantial shearing action, such as a Werner-Pfleiderer mixer or a colloid mill, and in the course of the mixing the carbon black pellets or granules (such being the typical initial form of the carbon black used in the process) are disintegrated. Mixing periods of 5 to 10 minutes are generally adequate to produce a homogeneous composition, although the mixing may be continued for indefinitely longer periods, e. g., 30 minutes, if desired without ill effects, but such prolonged mixing is not necessary. It will be understood that it is essential not to evaporate the water from the carbon black at this stage, since the specified amounts of water must be present in the carbon black when it is subsequently mixed with the rubber. It is convenient to dissolve the wetting agent in the water before adding the water to the carbon black.

The mixture of anionic wetting agent, water and carbon black prepared as described is then charged to a heavy duty gum rubber mixer of the Banbury type along with from 150 to 250 parts of bulk rubber, per 100 parts of the carbon black, and the whole is subjected to severe mastication or shearing action. As a consequence of the presence of the anionic wetting agent and the specified amounts of water along with the carbon black, the dispersion of the carbon black in the rubber is greatly facilitated, in comparison to conventional procedure. To understand the remarkable effect produced by the invention, it should first be recognized that there is a definite distinction between the concept of "incorporation" of the carbon black and the concept of "dispersion" of the carbon black, although these terms are sometimes used loosely, and in fact interchangeably, in the prior art. The difference is clear if one examines the rubber mixture under the microscope. Carbon black can be incorporated, yet not dispersed. The mixing process is roughly comprised of the following successive stages:

(1) Incorporation (absorption of the carbon black by the rubber).

(2) Homogenization (gross dispersion).

(3) Dispersion (microscopic and sub-microscopic mixing of the carbon black aggregates and particles).

In phase (1) the carbon black is absorbed by the rubber. In phase (2) the carbon black is distributed in the rubber matrix more or less uniformly. In the absorption process small amounts of rubber pick up large amounts of the carbon black. Redistribution occurs with continued mixing in phase (3) and the carbon black is finally dispersed as microscopic and sub-microscopic particles or aggregates. The distinguishing feature of my process is that it gives a remarkably faster rate of microscopic dispersion, or an improved degree of microscopic dispersion, depending upon how one wishes to utilize the process. Thus, by masticating the anionic wetting agent-water-carbon black mixture with the gum rubber for normal mixing times one obtains a far superior degree of microscopic dispersion than in conventional processes, or one can mix for considerably less than the conventional mixing time and still obtain a degree of microscopic dispersion that is as good as that obtained by conventional practices taking a much longer time.

It should be emphasized here that the effect of the specified amounts of water in admixture with the anionic wetting agent and the carbon black is unlike the effect that would be obtained in the presence of liquids having a swelling or solvent action on the bulk rubber. Liquids having a solvent or swelling action, such as oils, benzene, etc., may produce a more rapid incorporation (distinguished from true microscopic dispersion above) of the carbon black in the rubber, and therefore upon superficial observation it might be concluded that such liquids are aiding the mixing operation, but I have determined by microscopic observation that the actual state of dispersion of the carbon black is not improved by the presence of such liquids. In fact, I have observed that liquids which do swell rubber greatly, in contrast to the anionic wetting agent and water, which is of course devoid of swelling action, actually lead to much poorer microscopic dispersion, and they are therefore undesirable.

In place of preparing the mixture of carbon black containing the required amount of water and the anionic wetting agent beforehand in a Werner-Pfleiderer mixer or the like and adding this mixture to the bulk rubber in the Banbury, I may instead prepare the carbon black-water-anionic wetting agent mixture in the Banbury before or after adding the bulk rubber thereto. In any event it is essential that the anionic wetting agent and the specified amount of water be present when the carbon black is initially masticated with the rubber.

It is important to note that the beneficial effects of the present invention are obtainable only when the anionic wetting agent, water, carbon black and gum rubber are mixed under confinement in an internal mixer, where the mix is positively maintained under pressure in engagement with the masticating blades of the mixer. The desired effect is not obtained on an open roll mixer, where the anionic wetting agent-water-carbon black would merely be squeezed out of the rubber as the mixture passed through the nip of the mill rolls.

After the anionic wetting agent, water, carbon black and gum rubber have been masticated together in the internal mixer sufficiently to produce a suitable degree of microscopic dispersion, it is necessary to remove the greater part of the water from the mix. I typically accomplish this by expressing the water out of the mix, suitably by discharging the mixture from the Banbury onto a squeeze roll or other expressing device, wherein the water is removed from the rubber by application of pressure. Such mechanical expressing of the water serves to remove the bulk of the anionic wetting agent from the rubber stock. Devices suitable for this purpose are known, and may be of the type shown, for example, in U. S. Patent 2,371,722. Because of the fact that the water is thus expressed and removed from the mixture, there should not be employed, previous to this stage, any rubber compounding ingredients which are soluble in water to any substantial extent, since such water-insoluble ingredients would of course be lost when the water is expressed from the mixture.

Referring to the drawing, and in particular to Fig. 1, it will be observed that in the usual conventional factory practice, the carbon black and rubber are first mixed together in an initial mix known as a masterbatch, and such mixing typically leaves some 50–60% of the carbon black in an undispersed form (as measured by the procedure described in Example I, below). The next step is to continue the mixing in the Banbury while adding the remaining compounding ingredients, whereupon the undispersed carbon black is reduced to about 20%. The dispersion of the carbon black is still far from complete, and it is not until the stock is further mixed on roll mills, prior to being introduced to the tubers or extruders, that the undispersed carbon black is reduced to anywhere near an acceptable level.

In contrast to the foregoing, the method of the invention as shown in Fig. 2, typically employs a brief preliminary mixing of the carbon black and water containing the anionic wetting agent, and a subsequent mixing for only some six minutes in the Banbury is sufficient to reduce the undispersed carbon black to an unusually low and more than adequate level, even without any preliminary masterbatching. After expressing the water from the stock, the batch is in condition to be charged directly to the tubers without any necessity for an intermediate line of roll mills.

The method of the invention therefore simplifies factory mixing practice considerably, while at the same time making possible improvements in quality. The economies made possible by the invention will be particularly evident from a comparison of the necessary times which the stock must spend in the Banbury mixer in the conventional and in the present process. In the present process the necessary time in the Banbury mixer is very much reduced, and therefore the productivity of a Banbury mixer is greatly increased, or a given rate of productivity may be achieved with fewer or smaller Banbury mixers. Since the Banbury mixers are extremely heavy duty machines that require a substantial initial capital investment and that are expensive to maintain and to operate because of the large power consumption, it will be apparent that this feature of the invention represents a substantial economy. Similarly the possibility of dispensing with the usual additional roll mills, prior to the tuber, represents a further economy. These economies more than offset the comparatively small expense of the additional machinery used in the present process to make the carbon black-water-anionic wetting agent mix and to express the water, since such equipment is comparatively lighter and less expensive to install and operate.

The following examples will illustrate the practice of the invention in more detail. On the examples all parts are expressed by weight.

EXAMPLE I

To establish a standard of comparison for demonstrating the improved dispersion obtainable by the method of the invention, a test stock is first mixed by a conventional procedure, without using the anionic wetting agent and water. In this test stock 100 parts of carbon black is mixed with 195 parts of smoked sheet rubber along with about 11 parts of stearic acid and 11 parts of pine tar in a size B laboratory Banbury mixer operated at a slow rotor speed of 75 R. P. M. for a 3½ minute mixing cycle to make a carbon black masterbatch. To this masterbatch additional conventional compounding ingredients including the usual small amounts of sulfur, accelerator, zinc oxide, and antioxidant are then added, and a final mixing cycle of two minutes' duration is carried out. The stock is then discharged from the Banbury and sheeted once through a laboratory mill set for 0.100 gauge. The percent undispersed carbon black is measured in samples of the mixed stock by observing thin slices of the stock under the microscope at a magnification of 400✕. Undispersed black appears as opaque flake fragments or aggregates in contrast with comparatively transparent adjacent areas wherein the carbon black is well dispersed. By projecting the microscopic image onto a calibrated screen the area of the undispersed carbon black is determined, and, knowing the percent carbon black in the sample and the area and thickness of the sample, as well as the specific gravity of the carbon black and of the stock, the percent undispersed carbon black is readily calculated. The percent undispersed carbon black may be defined as that portion of the total carbon black in a given stock in the form of fragments measurable at a magnification of 400✕.

To demonstrate the invention, there is then prepared a slurry consisting of 100 parts of carbon black, 153 parts of tap water, and 13.3 parts of a 33% aqueous solution of a commercial anionic wetting agent sold under the trade name "Marasperse CB," and believed to be comprised of sodium sulfolignate. The slurry contains about 160 parts of water and about 4.3 parts of the commercial anionic wetting agent and is made by mixing these materials for 10 minutes in a Werner-Pfleiderer or Baker-Perkins mixer. This slurry is then mixed with about 200 parts of rubber, 11 parts of stearic acid and 11 parts of pine tar in the same manner as the standard test mix described previously, except that about 20 parts of the 33% aqueous solution of the commercial anionic wetting agent is also included. After the batch has knitted together the bulk of the water is drained out by opening the discharge side of the Banbury. Additional drying of the stock is effected by heating in a hot air oven for 3 hours at 250° F. in this experimental stock, although on a commercial scale this step could be dispensed with by using efficient equipment to express almost all of the water from the stock mechanically, and relying on the heat applied in a final brief milling operation to complete the drying if necessary. The thus-dried stock (masterbatch) is then compounded with the usual vulcanizing ingredients by mixing for 2 minutes in the Banbury, in the same manner as the control stock.

The comparative results of such standard test mix and the mix of the invention using the water and anionic wetting agent are shown in the following Table I.

Table I
COMPARISON OF CONVENTIONAL PROCEDURE WITH PROCEDURE OF INVENTION

|  | Test A | Test B |
|---|---|---|
| Composition of Slurry: |  |  |
| MPC #3 Carbon Black |  | 100 |
| 33% Water Solution of Marasperse CB |  | 13 |
| Tap Water |  | 153 |
|  |  | 266 |
| Composition of Masterbatch: |  |  |
| Plasticated Smoked Sheets | 195 | 200 |
| Slurry of Carbon Black, Water, and Anionic Wetting Agent |  | 266 |
| MPC #3 Carbon Black | 100 |  |
| Stearic Acid | 11 | 11 |
| Pine Tar | 11 | 11 |
| Additional 33% Water Solution of Marasperse CB |  | 20 |
| Undispersed Carbon Black: After masterbatching_____percent | 67 | 1 |
| Physical Properties: |  |  |
| After Curing 45 min. at 45# steam 300% Modulus (p. s. i.) | 1,600 | 1,750 |
| Tensile (p. s. i.) | 4,230 | 4,170 |
| Elongation, percent | 533 | 543 |
| Undispersed Carbon Black: In Final Stock_____percent | 31.4 | 0.25 |

It will be noted that at the conclusion of the initial or masterbatching mix, the carbon black was 67% undispersed in the conventional stock, but only 1% undispersed in the masterbatch of the invention. This remarkable improvement is preserved and accentuated in the final stock, wherein 31.4% of the carbon black is undispersed in the conventional mix, whereas only 0.25% of the carbon black remained undispersed in the stock of the invention. Furthermore, in a series of such tests, it is observed that the results obtained with the conventional mix are extremely variable, whereas the results obtained by the mixing procedure of the invention are consistent and uniform. Fig. 3 shows the microscopic appearance of the conventional stock, while Fig. 4 shows the appearance of of the stock mixed in accordance with the invention. The opaque areas of undispersed carbon black in Fig. 3 contrast with the uniform appearance of Fig. 4.

The physical properties of the vulcanized stocks, as illustrated in Table I, above, show that the vulcanizates processed in accordance with the invention compare favorably with those of the conventionally processed mixes in tensile, modulus, and elongation. The improved dispersion of the mixes of the invention is reflected in superior abrasion resistance, as well as enhanced tearing and cutting resistance.

Similar results are obtained by substituting in the foregoing example any of the known anionic wetting agents, in contrast to the cationic wetting agents and the non-ionic wetting agents, which are, in general, not satisfactory.

EXAMPLE II

Slurries of carbon black, water, and various amounts of two anionic wetting agents were prepared in accordance with the procedure of Example I in the proportions shown in Table II below, after which masterbatches were prepared and subjected to further milling on a roll mill for the various times shown in Table II. The "Nacconate G" is a commercial anionic wetting agent believed to be comprised of sodium xylene sulfonate.

*Table II*

EFFECT OF WETTING AGENT AND MILLING TIME ON UNDISPERSED CARBON BLACK

|  | Test C | Test D | Test E | Test F | Test G |
|---|---|---|---|---|---|
| Composition of Slurry: |  |  |  |  |  |
| Carbon Black MPC #3 | 100 | 100 | 100 | 100 | 100 |
| Tap Water | 160 | 160 | 160 | 160 | 160 |
| Marasperse CB | 2.2 | 4.4 | 6.6 |  |  |
| Nacconate G |  |  |  | 4.4 | 8.8 |
| Masterbatch (4 min., size 13 Banbury): |  |  |  |  |  |
| Plasticated Smoked Sheet | 138 | 138 | 138 | 138 | 138 |
| Slurry | 162 | 164 | 166 | 164 | 168 |

(Above stocks aged 16 days at room temperature)

| Percent, Undispersed Carbon Black, After Milling: |  |  |  |  |  |
|---|---|---|---|---|---|
| 1 minute | 6.0 | 0.68 | 0.76 | 0.50 | 0.59 |
| 3 minutes | 0.30 | 0.21 |  | 0.21 | 0.28 |
| 5 minutes | 0.26 | 0.13 |  | 0.27 | 0.22 |

In direct contrast with the unusually low values of undispersed carbon black obtained in the series of mixes illustrated in Table II, a conventionally processed carbon black masterbatch showed an undispersed carbon black value of 15.1% after five minutes' milling.

EXAMPLE III

A slurry was prepared of 100 parts of MPC #3 carbon black, 40 parts of tap water, and 4.4 parts of "Aquarex D," a commercial anionic wetting agent believed to be comprised of the sodium salt of a sulfuric ester of a mixture of lauryl and myristyl alcohols. This slurry was added to 200 parts of the low temperature type of GR-S rubber in a size B Banbury and mixed for 3½ minutes. After removing the bulk of the water, the masterbatch was then milled for five minutes on a laboratory mill. The undispersed carbon black amounted to 4% upon completion of this treatment. Conventionally processed low temperature GR-S stocks show much higher values of undispersed carbon black after similar processing.

EXAMPLE IV

In this example, the results of the conventional mixing procedure are compared to the results obtained when water is present in the mixture, both without any anionic wetting agent, and with various anionic wetting agents. In these tests, 100 parts of carbon black is employed along with 220 parts of smoked sheet rubber. In tests I, J, K and L, the carbon black is first mixed with 160 parts of water, and with the amounts of anionic wetting agent shown in Table III. The "Daxad" is a commercial anionic wetting agent believed to be comprised of a sodium salt of a polymerized alkaryl sulfonic acid. "Hornkem #1" is a commercial anionic wetting agent believed to be comprised of a purified lignin sulfonate solution. The stocks were masterbatched for 3½ minutes, and then (after removal of water, if present) mixed for another 2½ minutes, with the results shown in Table III, below.

*Table III*

|  | Percent Undispersed Carbon Black | |
|---|---|---|
|  | Master-batch | Final Mix |
| H. Conventional Mix (no water or anionic wetting agent) | 52.5 | 2.24 |
| I. Aqueous Mix (without anionic wetting agent) | 42.0 | 1.29 |
| Aqueous Mix with Anionic Wetting Agent: |  |  |
| J. Daxad (1.5% on wt. of water-carbon black slurry; or 4 parts per 100 of carbon black) | 38.2 | 0.45 |
| K. Hornkem #1 (1.5%) | 21.1 | 0.41 |
| L. Hornkem #1 (0.75%) | 33.2 | 0.63 |

It will be apparent from Table III that the anionic wetting agent, as in stocks J, K and L, produces a definite improvement over the use of water alone as in stock I, although the improvement over the conventional mix H is of course the most striking.

EXAMPLE V

In this example the carbon black-water slurry is prepared in situ in the Banbury. 100 parts of carbon black, the amount of water specified in Table IV, below, 194 parts of smoked sheet rubber, and 11 parts of pine tar are placed in the Banbury and mixed for 3½ minutes. To the resulting masterbatch there are added the remaining conventional compounding ingredients, followed by a second mixing stage of 2 minutes' duration. The following Table IV shows the amount of undispersed carbon black present after the first and second mixing stages, in comparison to the amount present in an otherwise similar conventional mix in which there was no water present during the mixing, and in comparison to mixes including water but no anionic wetting agent.

*Table IV*

EFFECT OF PREPARING WATER-CARBON BLACK SLURRY IN SITU

|  | Conventional Mix | Aqueous Paste Mix (No Anionic Wetting Agent) | | Aqueous Paste Mix With Anionic Wetting Agent (Aquarex D 1.5% by wt. of water-carbon black slurry or 4 parts in 100 parts of carbon black) | |
|---|---|---|---|---|---|
|  |  | 40 parts water | 160 parts water | 40 parts water | 160 parts water |
|  | M | N | O | P | Q |
| First Mix: Percent Undispersed Carbon Black | 53.3 | 38.9 | 3.64 | 1.75 | 1.21 |
| Final Mix: Percent Undispersed Carbon Black | 10.42 | 3.83 | 1.28 | 0.48 | 0.36 |

It will be apparent from the data in Table IV that the improved dispersion is readily attainable by making the carbon black paste in situ in the Banbury, instead of preparing it separately beforehand. Thees data also indicate that greatly reduced amounts of water are highly effective in the presence of the anionic wetting agent.

EXAMPLE VI

In order to demonstrate the fact that besides enhancing dispersion characteristics, the use of carbon black aqueous slurries with anionic wetting agents in accordance with the invention greatly reduces the power requirement to achieve a satisfactory degree of dispersion, the power consumption is measured in conventional mixing procedures, and compared to the power consumption in the procedures of the invention. The results of a number of tests are summarized in Table V below.

Table V
EFFECT OF INVENTION ON POWER CONSUMED DURING MIXING

| | Percent Undispersed Carbon Black | Power Consumption kw. h. |
|---|---|---|
| Test R—Conventional Mix | 47.8 | 0.23 |
| Test S—Aqueous Paste Mix With 0.15% Aquarex D | 1.43 | 0.10 |

It will be apparent that the method of the invention gives a far greater degree of dispersion, with less power consumption. For the mixing operation, the conventional process required much more power and gave a much higher value of percent undispersed carbon black. It is of interest to note that the power requirement to pre-mix the dry carbon black and the aqueous anionic wetting agent into slurry form is very low, the average power being less than 10% of that required for the conventional carbon black masterbatch Banbury mix.

EXAMPLE VII

In order to contrast the effect of the use of water in accordance with the invention on the dispersion of carbon black with the undesirable effect of materials which have a solvent or swelling action on rubber, Example I was repeated, using a paste made with carbon tetrachloride, in place of water and anionic wetting agent. After a 6 minute initial mix, followed by a 2 minute final mix, the amount of undispersed carbon black amounted to 90.5%. This contrasts with the less than 1% undispersed black obtained with the aqueous anionic wetting agent slurry, and, in fact, it is actually far worse than the dispersion obtained with a conventional mix containing no liquid at all.

It is important to note that small amounts of water are of no value, even in the presence of anionic wetting agents, in producing significant improvement in the dispersion of the carbon black. This is to be expected in view of the observation of Schoenfeld and Allen in their article on "Dispersibility of Gas Black," Industrial & Engineering Chemistry, vol. 25, No. 10, p. 1102 (October 1933), to the effect that dispersion is inhibited if the amount of water present amounts to more than 3% or so (see Fig. 7 and page 1105, lines 33–34 of second column). The improvement in dispersion realized by employing large amounts of water, in conjunction with anionic wetting agents, in accordance with the present invention is therefore unexpected.

Similarly, it can be shown that if the amount of water present exceeds the stated maximum of 250 parts in 100 parts of carbon black, the purposes of the invention are not served since slippage occurs during the mixing with the result that good dispersion is not attained.

The term "rubber" as used herein comprehends not only natural rubber, but the various synthetic rubbers known to be equivalent thereto for the purpose of making carbon black-reinforced vulcanizates suitable for tire treads and similar mechanical rubber goods.

Having thus described my invention, what I claim and desire to protect by Letters Patent is:

1. An improved method of effecting microscopic dispersion of carbon black in a rubber stock comprising subjecting to intense shearing action in a Banbury mixer a mixture of 100 parts of compressed carbon black, from 150 to 250 parts of bulk rubber, from 10 to 250 parts of water and from 2 to 10 parts of an anionic wetting agent, and thereafter removing the water from the mixture.

2. An improved method of effecting microscopic dispersion of carbon black in a rubber stock comprising uniformly mixing 100 parts of compressed carbon black with from 10 to 160 parts of water and from 2 to 10 parts of an anionic wetting agent, thereafter intensely mixing the carbon black-water preparation with from 150 to 250 parts of solid rubber in bulk form in a Banbury mixer, and subsequently removing the water from the resulting mixture.

3. An improved method of effecting microscopic dispersion of carbon black in a rubber stock comprising masticating in an internal mixer a mixture comprising 100 parts of pelletized dry carbon black and 150 to 250 parts of gum rubber in bulk form, from 10 to 50 parts of water, and from 2 to 10 parts of an anionic wetting agent, the mixture being devoid of water-soluble compounding ingredients other than the said anionic wetting agent, and thereafter expressing the water from the mixture.

References Cited in the file of this patent

UNITED STATES PATENTS

| | | |
|---|---|---|
| 1,245,700 | Geer | Nov. 6, 1917 |
| 2,585,659 | Kirkpatrick | Feb. 12, 1952 |
| 2,617,782 | Paton et al. | Nov. 11, 1952 |

OTHER REFERENCES

Drogin et al.: Ind. & Eng. Chem., Feb., 1944, pages 124–125.